Figure 4:
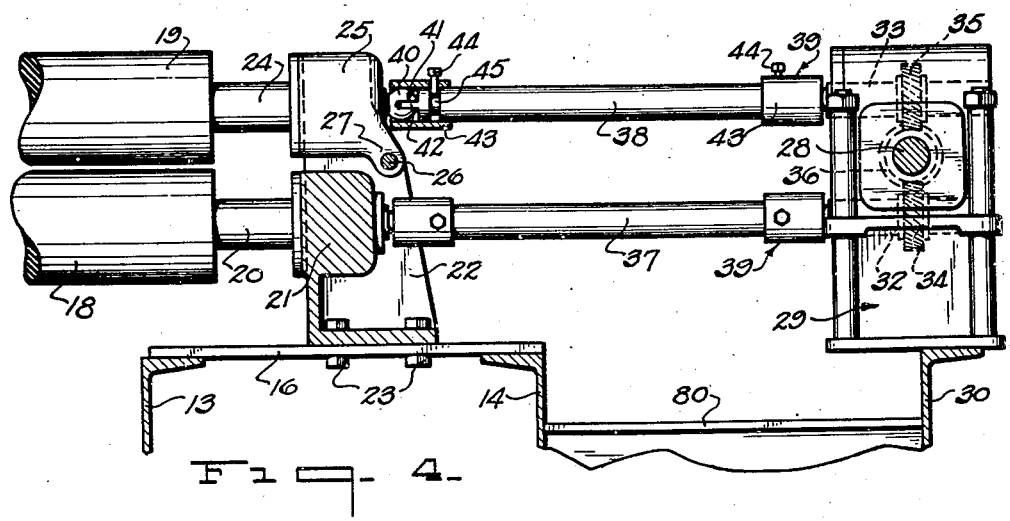

June 12, 1934.　　　J. P. CROWLEY ET AL　　　1,962,766
SURFACING APPARATUS
Filed March 23, 1932　　　3 Sheets-Sheet 1
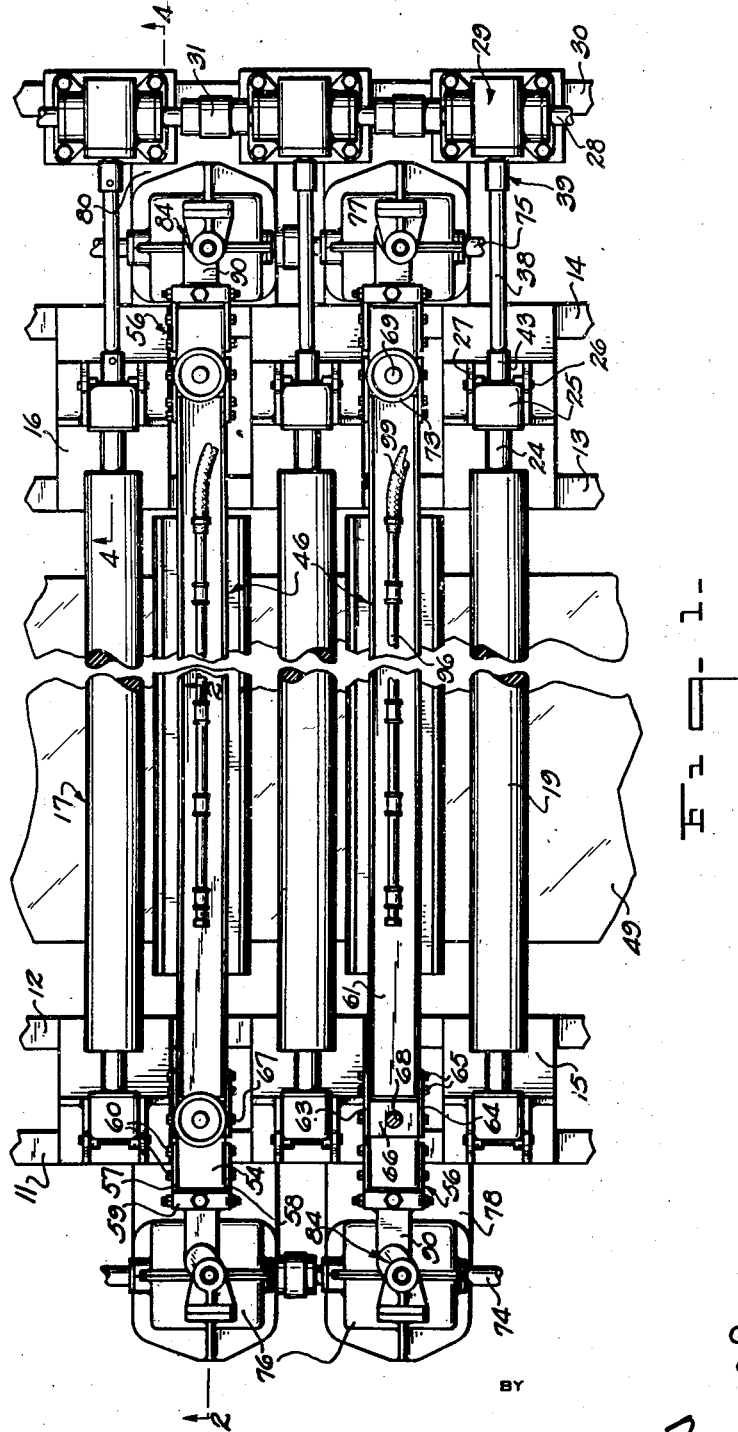
INVENTORS
JOSEPH P. CROWLEY.
GEORGE R. FORD JR.
BY Frank Fraser
ATTORNEY

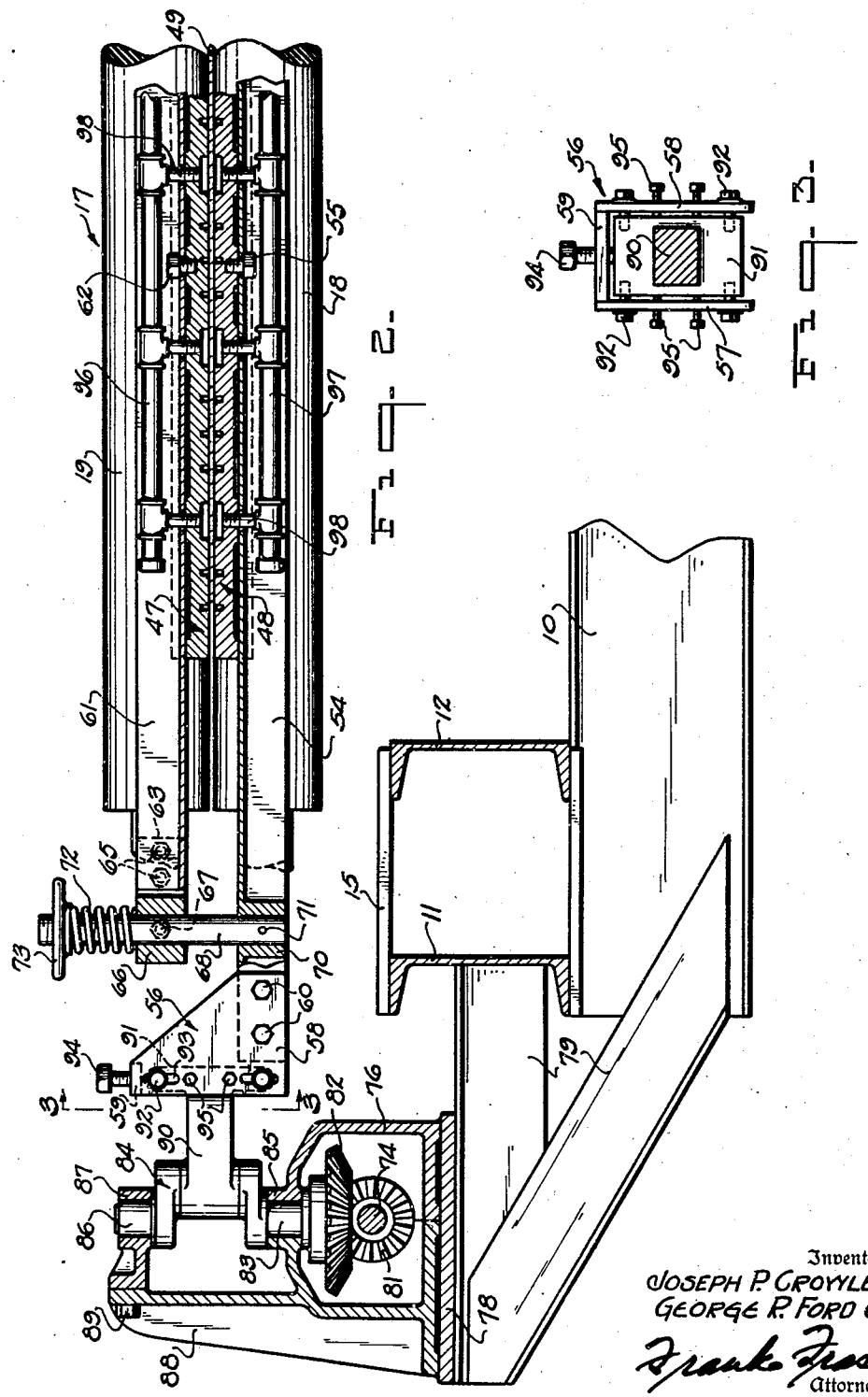

Inventors
JOSEPH P. CROWLEY
GEORGE P. FORD JR.

Patented June 12, 1934

1,962,766

UNITED STATES PATENT OFFICE 1,962,766

SURFACING APPARATUS

Joseph P. Crowley and George R. Ford, Jr., Toledo, Ohio, assignors to Libbey-Owens-Ford Glass Company, Toledo, Ohio, a corporation of Ohio Application March 23, 1932, Serial No. 600,695

23 Claims. (Cl. 51—119)

The present invention relates to improvements in a machine or apparatus for surfacing (grinding and/or polishing) plate glass or other flat sheets or plates.

Heretofore, in the grinding and polishing of plate glass according to one well-known process, it has been customary to secure the sheets or plates of glass to be surfaced upon the tops of a series of cars or tables by embedding them within a layer of plaster of Paris or the like, said tables being then propelled forwardly to carry the glass sheets or plates in a definite substantially horizontal path first beneath and in contact with a series of grinding runners and then beneath and in contact with a series of polishing runners to surface the upper faces thereof, after which the said sheets are turned over upon the tables, again secured thereto, and then passed beneath the same or a second series of grinding and polishing runners to surface the second side.

Although such a system as referred to above has attained considerable commercial success, yet there are nevertheless certain features thereof which, if eliminated, would result in a system even more desirable and advantageous. For instance, in such system, the surfaces of the glass sheets or plates are, of course, treated separately so that considerable time is consumed in the grinding and polishing operations. Also, the securing of the glass sheets upon the tables is a difficult operation requiring skilled labor, while the turning over and manipulation of the glass sheets sometimes results in the breakage thereof, which is attendant with considerable danger to the workmen as well as waste incident to such breakage.

The aim and principal object of this invention, therefore, is to obviate those objectionable features noted above by the provision of a sheet glass surfacing machine or apparatus which will effect the grinding and/or polishing of opposite surfaces of the sheets or plates of glass simultaneously and while the said sheets are being continuously carried forwardly in a definite predetermined path, thereby resulting in a great saving of time and material and making it unnecessary to embed the sheets in plaster of Paris or the like.

Another important object of the invention is the provision of a glass surfacing apparatus by the use of which a considerable cheapening and shortening of the glass surfacing operations may be achieved, and also by means of which the amount of handling of the glass may be reduced to a minimum.

A further object of the invention is the provision of such an apparatus embodying a plurality of grinding and/or polishing units, each including a pair of surfacing elements between and in contact with which the glass sheets to be treated are passed, means being also provided for effecting a desired movement of the surfacing elements of each unit transversely of the path of travel of the glass.

Still further objects of the invention are the provision of novel means for mounting each pair of surfacing elements so that they are movable as a unit; the provision of means for swinging the surfacing elements about a longitudinal axis to maintain the operative faces of the said surfacing elements in a horizontal position; and the provision of means for yieldably urging one of the surfacing elements toward the other surfacing element.

Other objects and advantages of the invention will become more apparent during the course of the following description when taken in connection with the accompanying drawings.

Figure 5:
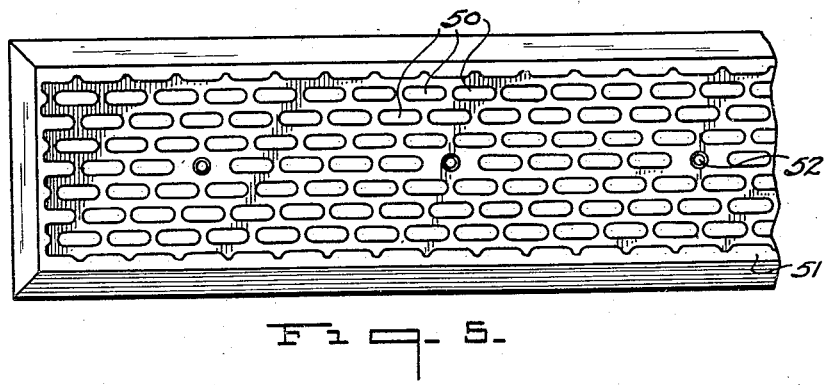
Figure 6:
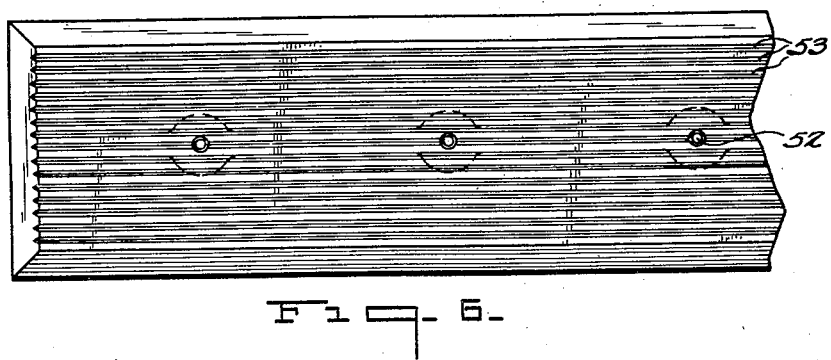

In the drawings forming a part of this application and wherein like numerals are employed to designate like parts throughout the same, Fig. 1 is a plan view of a portion of a surfacing machine constructed in accordance with the present invention, Fig. 2 is a transverse section taken substantially on line 2—2 of Fig. 1, Fig. 3 is a detail section taken substantially on line 3—3 of Fig. 2, Fig. 4 is a view taken substantially on line 4—4 of Fig. 1, Fig. 5 is a bottom view of one type of grinding runner which may be used in connection with the present invention, and Fig. 6 is a similar view of another type of grinding runner.

Referring now more particularly to the drawings, the operative parts of the surfacing machine are carried upon a suitable sub-structure or supporting framework which has not been completely shown in detail but which includes a plurality of spaced parallel transversely extending I-beams 10 which are arranged at spaced points throughout the length of the machine and suitably supported in any desired manner. Carried upon the I-beams 10 at one side of the machine are the spaced longitudinally extending channel beams 11 and 12, while supported upon the I-beams 10 at the opposite side of the machine are the spaced longitudinally extending channel beams 13 and 14. Extending between and carried by the channel beams 11 and 12 are a plurality of spaced horizontal plates 15, while a plurality of similar plates 16 are carried by the channel beams 13 and 14, the plates 15 and 16 being arranged opposite one another.

The numeral 17 designates generally a plurality of pairs of horizontally aligned sheet supporting and feeding rolls, each pair including a lower roll 18 and an upper roll 19. The plurality of pairs of conveying rolls 17 are all mounted for rotatable movement at their opposite ends within bearings mounted upon the plates 15 and 16 carried by the respective pairs of channel beams 11—12 and 13—14. Thus, the lower roll 18 of each pair is carried upon a shaft 20 journaled at each end within a bearing block 21 carried by the supporting bracket 22 which rests upon and is secured to the respective plate 15 or 16 by suitable fastening elements 23. The upper roll 19 of each pair is carried by a shaft 24 rotatably supported at each end within a bearing block 25 secured to the respective supporting bracket 22 by a transverse pin 26 passing through the ears 27 formed on the said bearing block. The rolls 18 and 19 are preferably constructed of relatively hard rubber or some other suitable material.

For the purpose of simultaneously driving the several pairs of rolls 17, there is arranged at one side of the machine a longitudinally extending drive shaft 28 driven from any suitable motor or prime mover (not shown). This shaft extends through a plurality of housings 29, one of which is provided opposite the adjacent end of each pair of rolls 17; being mounted upon a channel beam 30 also extending longitudinally of the machine outwardly of the respective bearing blocks 21 and 25. The shaft 28 may consist of a plurality of relatively short sections connected end to end by flexible couplings 31. Mounted within each housing 29 beneath and above the shaft 28 and disposed transversely thereof are the relatively short horizontal shafts 32 and 33 to which are keyed worm gears 34 and 35 respectively meshing with and driven from a worm gear 36 fixed on shaft 28.

The rolls 18 and 19 are adapted to be driven from the shafts 32 and 33 through the intermediate shafts 37 and 38 respectively, the shafts 37 and 38 being detachably connected at one end to shafts 32 and 33 and at their opposite end to the roll shafts 20 and 24 by the coupling means 39. As illustrated in Fig. 4, the upper roll shaft 24 projects beyond the bearing block 25 and is formed at its extreme end with a ball-shaped or rounded head 40 having an open slot 41 therein within which is received the flat projection 42 provided at the adjacent end of shaft 38. Encircling the adjacent ends of the two shafts 24 and 38 is a collar 43, and carried by this collar is a set screw 44 which projects therethrough and is received within an annular groove 45 in shaft 38 whereby the collar 43 is secured against sliding movement. When the said collar is thus secured in place, the adjacent ends of shafts 24 and 38 are prevented from becoming disconnected. However, when it is desired to disengage shaft 38 from shaft 24, it is simply necessary to first move the set screw 33 out of the groove 45, after which the collar 43 can be readily slid along shaft 38, whereupon the projection 42 can then be removed from the slot 41. The opposite end of the shaft 38 is connected with the adjacent end of shaft 33 in the same manner and likewise the shaft 37 is connected with shafts 21 and 32 also in the same way. With the construction above described, it will be seen that upon disengagement of shaft 38 from shaft 24, the upper roll 19 can, upon removal of the pin 26 at the same side of the machine, be lifted up and swung about the pin 26 at the opposite side of the machine. In this way, the roll 19 can be moved away from roll 18 whenever desired.

Arranged between the adjacent pairs of conveying rolls 17 are a plurality of grinding units 46, each unit including the horizontally arranged upper and lower runners 47 and 48 respectively, between which the glass sheets 49 to be treated are passed. These grinding units 46 are arranged alternately with the pairs of rolls 17, and the runners 47 and 48 of each unit are superimposed one above and one below the normal path of travel of the sheet, so as to act upon opposite surfaces thereof simultaneously as it is passed therebetween.

Each grinding runner comprises a substantially flat horizontal bar or plate which may be of any desired construction, two particular forms being illustrated by way of example in Figs. 5 and 6. As shown in Fig. 5, the runner bar is of substantially rectangular formation and is provided upon the operative face thereof with a plurality of spaced grinding projections 50. These projections are arranged in a plurality of rows extending longitudinally of the runner, with the projections of adjacent rows being staggered, and the projections of alternate rows being in alignment with one another. Surrounding the projections 50 at the edges of the runner bar is a continuous flange 51, and the abrasive material is adapted to be supplied to the operative face of the runner bar through the openings 52 therein. In Fig. 6, the runner bar is formed with a plurality of spaced longitudinally extending grooves 53 which extend throughout the entire length thereof, the portions of the runner bar between the grooves constituting the grinding projections. This type of runner is also provided with a plurality of openings 52 through which the abrasive is adapted to be supplied to the operative face thereof.

The lower grinding runner 48 of each unit is carried upon a supporting member 54 in the form of an inverted channel beam; being secured thereto by suitable fastening elements 55. The supporting beam 54 extends, at its opposite ends, beyond the grinding runner and is carried at each end by a bracket designated in its entirety by the numeral 56. Each bracket 56 is of inverted, substantially U-shaped construction and includes the spaced vertical side plates 57 and 58 connected at their upper ends by the horizontal cross piece 59. The opposite ends of the channel beam 54 are received between the side plates 57 and 58 of the brackets 56 and are secured thereto by the fastening elements 60.

The upper grinding runner 47 is carried by a supporting member 61 also in the form of a channel beam; being secured thereto by a plurality of fastening elements 62. The channel beam 61, while projecting at its opposite ends beyond the runner 47, is slightly shorter than the lower channel beam 54 and has secured to the opposite sides thereof at each end, the plates 63 and 64. These plates are secured to the channel beam by fastening elements 65, and project outwardly therebeyond. Received between the outer end portions of the plates 63 and 64 is a block 66 secured thereto by screws 67.

The blocks 66 at opposite ends of the supporting beam 61 are slidably mounted upon vertical pins 150

68 and 69 respectively, received at their lower ends within solid portions 70 formed on the channel beam 54; being secured thereto as at 71. Encircling each of the pins 68 and 69 above the respective block 66 is a compression spring 72, and threaded upon the pin above the compression spring is an adjusting wheel 73. The springs 72 act to yieldably urge the upper grinding runner 47 toward the lower grinding runner 48 so as to exert a yielding pressure upon the glass sheet 49 passing therebetween. The compression of the springs 72 may be varied upon proper adjustment of the hand wheels 73.

With the above construction, the upper grinding runner 47 may be swung bodily upwardly away from the lower grinding runner 48. That is to say, upon removal of the fastening elements 65 at one side of the machine, the grinding runner 47 can be swung upwardly about the screws 56 at the opposite side of the machine.

The several grinding units 46 are adapted to be driven simultaneously from the opposite ends thereof, and to this end there are arranged at opposite sides of the machine the two longitudinally extending line shafts 74 and 75, the line shaft 74 passing through a plurality of housings 76, while the shaft 75 passes through a plurality of similar housings 77. A pair of housings 76 and 77 is provided for each grinding unit, the housing 76 being supported upon a horizontal platform 78 carried by the members 79, (Fig. 2), while the housing 77 is mounted upon a platform 80 extending between and secured to the channel beams 14 and 30 (Fig. 4).

Mounted upon each of the shafts 74 and 75 within each of the housings 76 and 77 is a spiral gear 81 meshing with and driving a spiral gear 82 carried by the end 83 of the crank 84. The end 83 of the crank 84 is rotatably supported in the bearing 85 formed as a part of housing 76, while the opposite end 86 of the said crank is journaled in a bearing 87, removably secured to the bracket 88 by bolts 89.

Pivotally mounted upon the crank 84 is a horizontal arm 90, the outer end of which is formed with a substantially rectangular head 91 received between the spaced side plates 57 and 58 of the corresponding bracket 56. The bracket 56 is secured to the head 91 by a plurality of set screws 92 which pass through vertical slots 93 in the side plates 57 and 58 and are received within recesses in the said head. Passing downwardly through the top cross piece 59 of bracket 56 is a set screw 94 engaging the top of the head 91. With this arrangement, it will be apparent that the brackets 56 can be adjusted vertically relative to the supporting head 91 to effect vertical adjustment of the grinding unit carried thereby. In other words, the upper and lower grinding runners 47 and 48 respectively will be moved as a unit, and due to such vertical adjustment of the grinding units, the lower grinding runners can be maintained in horizontal alignment with one another. Also, with this arrangement, it is possible to adjust either end of the grinding unit vertically, independently of the opposite end.

Also passing laterally through each of the side plates 57 and 58 and engaging the supporting head 91 are the set screws 95, and upon proper adjustment of these set screws, the brackets 56 and likewise the grinding runners 47 and 48 may be swung about a longitudinal axis relative to the supporting arms 90 to bring the operative face of the said runners into a truly horizontal position. This is desirable since, in the event the runners of one unit should become tilted or cocked at a slight angle with respect to the horizontal, it will be apparent that the passage of the glass sheet between the runners will be very apt to result in the breakage of the glass. Therefore, should the runners, for one reason or another, become slightly tilted, this condition can be easily and quickly corrected upon proper adjustment of the set screws 95.

Upon rotation of the line shafts 74 and 75, the spiral gears 81 and 82 will effect rotation of the cranks 84 so as to impart an oscillatable movement to the grinding units transversely of the path of travel of the glass sheets. It will, of course, be apparent that since the upper and lower grinding runners of each unit are connected together, they will be oscillated as a unit. All of the grinding units can be caused to move in the same direction simultaneously or, if preferred, alternate units may move in opposite directions.

The grinding action is ordinarily achieved by a relative movement between the grinding runners and the glass in conjunction with a suitable abrasive material. The abrasive material may be supplied to the operative faces of the upper and lower grinding runners through the supply conduits 96 and 97 respectively, these conduits extending longitudinally of the runners and having lateral outlet pipes 98 which are received within the openings 52 in the said runners. The conduits 96 and 97, for feeding the abrasive material to the grinding runners, may be associated with and adapted to receive the abrasive material from any suitable abrasive grading and feeding system. While the runners of each unit are adapted to receive the same grade of abrasive, yet the runners of each succeeding grinding unit may receive a different grade of abrasive so as to effect the desired treatment of the glass from rough grinding to final smoothing. Since the conduits 96 and 97 oscillate with the grinding runners, they are preferably connected with the abrasive grading system by suitable flexible conduits 99.

In operation, the glass sheets 49 are carried successively between the runners of the several grinding units 46 by means of the pairs of rotatable rolls 17. The machine may include any desired number of grinding units and, as the sheets are carried through the machine, the several units are oscillated in the manner above described and a suitable abrasive material delivered thereto so as to effect the grinding of the glass. The machine may also embody the use of a plurality of polishing units following the grinding units, and while not essential, these units may be of substantially the same construction and operated in the same manner as the grinding units. However, the operative working faces of the polishing units are covered with a suitable polishing pad of felt or the like which will have the desired polishing action upon the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for surfacing sheet glass, means for passing the sheets to be treated in a definite predetermined path, a surfacing unit including spaced surfacing runners having substantially flat rectangular operative faces engaging opposite surfaces of said sheets to simultaneously surface the same during the travel thereof, means for moving the runners transversely of the path of travel of the glass sheets, and means for turning the said runners about a longitudinal axis extending transversely of the path of travel of the glass sheets to bring the operative faces thereof into a horizontal position and to maintain them in such position.

2. In apparatus for surfacing sheet glass, means for passing the sheets to be treated in a definite predetermined path, a surfacing unit including spaced surfacing runners having substantially flat rectangular operative faces engaging opposite surfaces of said sheets to simultaneously surface the same during the travel thereof, means for moving the runners as a unit transversely of the path of travel of the glass sheets, and means for turning the said runners as a unit about a longitudinal axis extending transversely of the path of travel of the glass sheets to bring the operative faces thereof into a horizontal position and to maintain them in such position.

3. In apparatus for surfacing sheet glass, means for passing the sheets to be treated in a definite predetermined path, a surfacing unit including spaced surfacing runners having substantially flat rectangular operative faces engaging opposite surfaces of said sheets to simultaneously surface the same during the travel thereof, means for moving the runners transversely of the path of travel of the glass sheets, means for turning the said runners about a longitudinal axis extending transversely of the path of travel of the glass sheets to bring the operative faces thereof into a horizontal position and to maintain them in such position, and means for yieldably urging one of the runners toward the other runner.

4. In apparatus for surfacing sheet glass, means for passing the sheets to be treated in a definite predetermined path, a surfacing unit including spaced surfacing runners having substantially flat rectangular operative faces engaging opposite surfaces of said sheets to simultaneously surface the same during the travel thereof, means for moving the runners as a unit transversely of the path of travel of the glass sheets, means for turning the said runners as a unit about a longitudinal axis extending transversely of the path of travel of the glass sheets to bring the operative faces thereof into a horizontal position and to maintain them in such position, and means for yieldably urging one of the runners toward the other runner.

5. In apparatus for surfacing sheet glass, means for passing the sheets to be treated in a definite predetermined path, a sufacing unit including spaced superimposed surfacing runners having substantially flat rectangular operative faces engaging opposite surfaces of said sheets to simultaneously surface the same during the travel thereof, means for moving the runners transversely of the path of travel of the glass sheets, means for turning the said runners about a longitudinal axis extending transversely of the path of travel of the glass sheets to bring the operative faces thereof into a horizontal position and to maintain them in such position, and means for moving the surfacing runners bodily vertically.

6. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, means for moving the runners as a unit transversely of the path of travel of the glass sheets, means for turning the said runners as a unit about a longitudinal axis extending transversely of the path of travel of the glass sheets to bring the operative faces thereof into a horizontal position and to maintain them in such position, and means for moving the surfacing runners bodily vertically.

7. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, means for moving the runners transversely of the path of travel of the glass sheets, means for turning the said runners about a longitudinal axis extending transversely of the path of travel of the glass sheets to bring the operative faces thereof into a horizontal position and to maintain them in such position, means for yieldably urging one of the runners toward the other runner, and means for moving the surfacing runners bodily vertically.

8. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, means for moving the runners as a unit transversely of the path of travel of the glass sheets, means for turning the said runners as a unit about a longitudinal axis extending transversely of the path of travel of the glass sheets to bring the operative faces thereof into a horizontal position and to maintain them in such position, means for yieldably urging one of the runners toward the other runner, and means for moving the surfacing runners bodily vertically.

9. In apparatus for surfacing sheet glass, means for passing the sheets to be treated in a definite predetermined path, a surfacing unit including spaced superimposed surfacing runners engaging opposite faces of said sheets to simultaneously surface the same during the travel thereof, a common supporting means for the surfacing runners, means for moving said supporting means and the surfacing runners carried thereby transversely of the path of travel of the sheets, and means for yieldably urging one of said runners toward the other runner.

10. In apparatus for surfacing sheet glass, means for passing the sheets to be treated in a definite predetermined path, a surfacing unit including spaced superimposed surfacing runners engaging opposite faces of said sheets to simultaneously surface the same during the travel thereof, a common supporting means for the surfacing runners, means for moving said supporting means and the surfacing runners carried thereby transversely of the path of travel of the sheets, and means for moving the runners bodily vertically.

11. In apparatus for surfacing sheet glass, means for passing the sheets to be treated in a definite predetermined path, a surfacing unit including spaced superimposed surfacing runners engaging opposite faces of said sheets to simultaneously surface the same during the travel thereof, a common supporting means for the surfacing runners, means for moving said supporting means and the surfacing runners carried thereby transversely of the path of travel of the sheets, means for yieldably urging one of said runners toward the other runner, and means for moving the runners bodily vertically.

12. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, a common supporting means for the surfacing runners, means for moving said supporting means and the surfacing runners carried thereby transversely of the path of travel of the glass sheets, and means for turning a supporting means and the surfacing runners carried thereby about a longitudinal axis extending transversely of the path of travel of the glass sheets to bring the operative faces thereof into a horizontal position and to maintain the said runners in such position.

13. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, a common supporting means for the surfacing runners, means for moving said supporting means and the surfacing runners carried thereby transversely of the path of travel of the glass sheets, means for turning the supporting means and the surfacing runners carried thereby about a longitudinal axis extending transversely of the path of travel of the glass sheets to bring the operative faces thereof into a horizontal position and to maintain the said runners in such position, and means for moving the supporting means and the surfacing runners carried thereby bodily vertically.

14. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, a common supporting means for the surfacing runners, means for moving said supporting means and the surfacing runners carried thereby transversely of the path of travel of the glass sheets, means for turning the supporting means and the surfacing runners carried thereby about a longitudinal axis extending transversely of the path of travel of the glass sheets to bring the operative faces thereof into a horizontal position and to maintain the said runners in such position, and means for yieldably urging one of the surfacing runners toward the other surfacing runner.

15. In apparatus for surfacing sheet glass, means for passing the sheets to be treated in a definite predetermined path, a surfacing unit including spaced superimposed surfacing runners engaging opposite faces of said sheets to simultaneously surface the same during the travel thereof, a main supporting means for supporting the lower surfacing runner, means carried by the main supporting means for supporting the upper surfacing runner, means for moving the said main supporting means and the surfacing runners carried thereby transversely of the path of travel of the sheets, and means for yieldably urging the upper surfacing runner toward the lower surfacing runner.

16. In apparatus for surfacing sheet glass, means for passing the sheets to be treated in a definite predetermined path, a surfacing unit including spaced superimposed surfacing runners engaging opposite faces of said sheets to simultaneously surface the same during the travel thereof, a main supporting means for supporting the lower surfacing runners, means carried by the main supporting means for supporting the upper surfacing runner, means for moving the said main supporting means and the surfacing runners carried thereby transversely of the path of travel of the sheets, means for yieldably urging the upper surfacing runner toward the lower surfacing runner, and means for moving the runners bodily vertically.

17. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, a main supporting means for supporting the lower surfacing runner, means carried by the main supporting means for supporting the upper surfacing runner, means for moving said main supporting means and the surfacing runners carried thereby transversely of the path of travel of the glass sheets, and means for turning the main supporting means and the surfacing runners carried thereby about a longitudinal axis extending transversely of the path of travel of the glass sheets to bring the operative faces thereof into a horizontal position and to maintain the said surfacing runners in such position.

18. In apparatus for surfacing sheet glass, means for passing the sheets to be treated in a definite predetermined path, a surfacing unit including spaced superimposed surfacing runners having substantially flat rectangular operative faces engaging opposite surfaces of said sheets to simultaneously surface the same during the travel thereof, a main supporting means for supporting the lower surfacing runner, means carried by the main supporting means for supporting the upper surfacing runner, means for moving said main supporting means and the surfacing runners carried thereby transversely of the path of travel of the glass sheets, means for turning the main supporting means and the surfacing runners carried thereby about a longitudinal axis extending transversely of the path of travel of the glass sheets to bring the operative faces thereof into a horizontal position and to maintain the said surfacing runners in such position, means for yieldably urging one of the surfacing runners toward the other surfacing runner, and means for moving the runners vertically.

19. In apparatus for surfacing sheet glass, a surfacing unit including spaced superimposed surfacing runners engaging opposite faces of said sheets to simultaneously surface the same, means for passing the sheets to be treated in a definite predetermined path between said surfacing runners including a pair of superimposed sheet feeding rolls, and means for supporting the rolls so that the upper roll may be swung bodily upwardly away from the lower roll about a horizontal axis located at one end of said upper roll.

20. In apparatus for surfacing sheet glass, means for passing the sheets to be treated in a definite substantially horizontal path, a plurality of surfacing units positioned in substantial horizontal alignment relative to one another and adapted to be successively engaged by the glass sheets during the horizontal travel thereof, each surfacing unit including spaced surfacing runners having substantially flat rectangular operative faces engaging opposite surfaces of said sheets to simultaneously surface the same, means for moving the runners of each surfacing unit as a unit transversely of the path of travel of the glass sheets, and separate means for independently turning the said runners of each unit as a unit about a longitudinal axis extending transversely of the path of travel of the glass sheets to bring the operative faces thereof into a horizontal position and to maintain them in such position.

21. In apparatus for surfacing sheet glass, means for passing the sheets to be treated in a definite substantially horizontal path, a surfacing unit including spaced surfacing runners having substantially flat rectangular operative faces engaging opposite surfaces of said sheets to simultaneously surface the same during the travel thereof, supporting members for the upper and lower surfacing runners, means for moving the runners as a unit transversely of the path of travel of the glass sheets including a bracket member carried at each end of the supporting member for the lower surfacing runner, a rotatable crank having an arm formed with a substantially rectangular head received between spaced portions of said bracket member and secured thereto, means carried by said bracket member and engaging said head for raising and lowering the surfacing runners bodily vertically as a unit, and means also carried by the bracket member and engaging the head for turning the said runners as a unit about a longitudinal axis extending transversely of the path of travel of the glass sheets to bring the operative faces thereof into a horizontal position and to maintain them in such position.

22. In apparatus for surfacing sheet glass, means for passing the sheets to be treated in a definite substantially horizontal path, a surfacing unit including spaced surfacing runners having substantially flat rectangular operative faces engaging opposite surfaces of said sheets to simultaneously surface the same during the travel thereof, supporting members for the upper and lower surfacing runners, vertical pins carried by the supporting member for the lower surfacing runner and upon which the supporting member for the upper surfacing runner is slidably mounted, a compression spring encircling each pin above the supporting member for the upper surfacing runner and acting to yieldably urge the upper surfacing runner downwardly toward the lower surfacing runner, and means connected with the supporting member for the lower surfacing runner for moving the said runners as a unit transversely of the path of travel of the glass sheets.

23. In apparatus for surfacing sheet glass, means for passing the sheets to be treated in a definite substantially horizontal path, a surfacing unit including spaced surfacing runners having substantially flat rectangular operative faces engaging opposite surfaces of said sheets to simultaneously surface the same during the travel thereof, supporting members for the upper and lower surfacing runners, vertical pins carried by the supporting member for the lower surfacing runner and upon which the supporting member for the upper surfacing runner is slidably mounted, a compression spring encircling each pin above the supporting member for the upper surfacing runner and acting to yieldably urge the upper surfacing runner downwardly toward the lower surfacing runner, means connected with the supporting member for the lower surfacing runner for moving the said runners as a unit transversely of the path of travel of the glass sheets, and means for turning the said supporting members and surfacing runners carried thereby as a unit about a longitudinal axis extending transversely of the path of travel of the glass sheets to bring the operative faces of the said runners into a horizontal position and for maintaining them in such position.

GEORGE R. FORD, Jr.
JOSEPH P. CROWLEY.